(No Model.)
T. A. EDISON.
WEBERMETER.
No. 248,565. Patented Oct. 18, 1881.
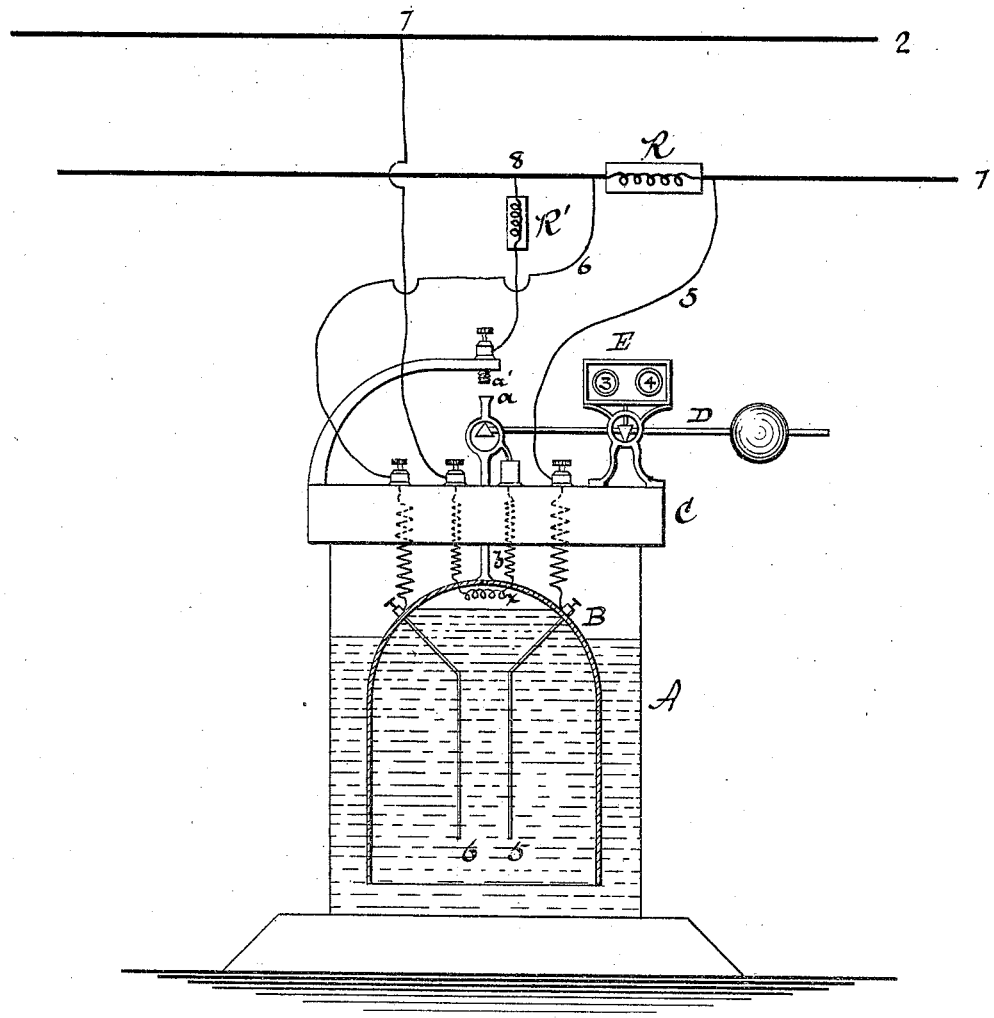

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

WEBERMETER.

SPECIFICATION forming part of Letters Patent No. 248,565, dated October 18, 1881.

Application filed December 15, 1880. (No model.)

*To all whom it may concern:*

Be it known that I, THOMAS A. EDISON, of Menlo Park, in the county of Middlesex and State of New Jersey, have invented a new and useful Webermeter; and I do hereby declare that the following is a full and exact description of the same, reference being had to the accompanying drawing, and to the letters of reference marked thereon.

My invention relates to apparatus for measuring an electric current, and belongs to the general class of apparatus to which I have applied in a prior application the name below noted.

My arrangement for this purpose consists in deflecting a definite proportional part of the current to be measured and passing it through a vessel partially filled with water and floating in the same liquid. The water in the vessel is decomposed by the current, and the gases formed displace a portion of the water in the vessel, lessening its specific gravity and causing it to rise. The rising of the vessel causes the lifting of a lever connected with a registering mechanism, so that, the amount of gases produced being proportional to the current passing through the vessel, and this in turn proportional to the main current, the last may be indicated by the register. Such arrangement is made that when a definite predetermined amount of decomposition has taken place the vessel will rise to a sufficient height to close an electrical circuit which will send a current through the gases and explode them, so that they will be recomposed into water and the vessel again fall, these operations being repeated so long as current passes.

The accompanying drawing is a sectional view of a form of my invention.

A is a tank of water, and B a vessel, also containing water, floating therein.

1 2 is the main circuit, from which, by means of a resistance placed at R, a definite portion of the current is deflected into the circuit 5 6. This circuit passes through the water in the vessel B, and returns again to the main circuit.

7 8 is a third circuit from the main one, and is broken at the contact-points $a$ $a'$.

C is the top of the tank A. It supports a suitable registering apparatus, E, and the contact $a$, and the wires of the circuits 5 6 and 7 8 pass through it. Also passing through C is the projection $b$, which extends up from the vessel B, operating the lever D of the registering apparatus, and terminating in the contact-point $a$.

As above stated, in consequence of the resistance R a definite portion of the current is deflected from the main current into the wire 5, and passes down through C into the vessel B. The lower portion of this circuit 5 6 is completed by the water, and the current, in passing through it, decomposes a portion thereof, which rises in a gaseous form to the surface. As the upper portion of the vessel becomes filled with these gases the specific gravity of the whole is lessened and the vessel rises, carrying with it the projection $b$, and thus moving the lever D, which operates the register. When the upper part of the vessel B is entirely filled with the gases it rises to such a height that the contact $a$ will meet $a'$ and close the circuit 7 8. A current of electricity immediately passes along this circuit, heating the platinum coil $x$ and causing, by explosion, the recomposition of the gases into water. The vessel B then falls to its former position, reopening the circuit 7 8, and the electricity again passes through the circuit 5 6. This operation is, of course, continually repeated. A resistance placed at R' prevents the passage of too large a current of electricity through the circuit 7 8.

What I claim is—

1. In a webermeter, the combination of a floating electrolytic cell, means actuated thereby for causing the recomposition of the water decomposed therein, and means for registering the rise and fall of the floating cell, substantially as set forth.

2. The method of measuring an electric current consisting in registering the rise and fall of a floating electrolytic cell, through the fluid of which a definite proportion of the current passes, substantially as set forth.

This specification signed and witnessed this 3d day of December, 1880.

THOS. A. EDISON.

Witnesses:
H. W. SEELY,
S. D. MOTT.